US 9,789,547 B2

(12) United States Patent
Hacker et al.

(10) Patent No.: US 9,789,547 B2
(45) Date of Patent: Oct. 17, 2017

(54) CUTTING TOOL, PARTICULARLY A BORING BAR, AS WELL AS A PROCESS FOR MACHINING A NUMBER OF BORES

(71) Applicant: Kennametal Inc., Latrobe, PA (US)

(72) Inventors: Michael Hacker, Nuremberg (DE); Sebastian Kunschir, Winklarn (DE)

(73) Assignee: KENNAMETAL INC., Latrobe, PA (US)

( * ) Notice: Subject to any disclaimer, the term of this patent is extended or adjusted under 35 U.S.C. 154(b) by 0 days.

(21) Appl. No.: 14/895,852

(22) PCT Filed: Jun. 3, 2014

(86) PCT No.: PCT/EP2014/001486
§ 371 (c)(1),
(2) Date: Dec. 3, 2015

(87) PCT Pub. No.: WO2014/195007
PCT Pub. Date: Dec. 11, 2014

(65) Prior Publication Data
US 2016/0114401 A1    Apr. 28, 2016

(30) Foreign Application Priority Data

Jun. 4, 2013    (DE) .................. 10 2013 210 332

(51) Int. Cl.
*B23B 29/02*    (2006.01)
*B23B 29/03*    (2006.01)
*B23B 27/00*    (2006.01)

(52) U.S. Cl.
CPC ............ *B23B 29/022* (2013.01); *B23B 29/02* (2013.01); *B23B 29/03* (2013.01); *B23B 27/002* (2013.01);
(Continued)

(58) Field of Classification Search
CPC ............ B23B 2250/04; B23B 2250/16; B23B 27/007; B23B 27/002; B23B 41/12;
(Continued)

(56) References Cited

U.S. PATENT DOCUMENTS 2,426,359 A  *  8/1947  Lankheet ............... B23B 29/022
                                                      408/143
2,842,014 A  *  7/1958  Miller .................... B23B 29/022
                                                      408/144
(Continued)

FOREIGN PATENT DOCUMENTS

DE           3429498 A  *  8/1986
DE        19720823 A1    11/1998
(Continued)

OTHER PUBLICATIONS

Machine translation, German patent document, DE3429498, "Reaming tool with guides engaging machined bore has second guide on opposite side of reamer from cutter", Mapal, Aug. 1986.*
(Continued)

*Primary Examiner* — Daniel Howell
*Assistant Examiner* — Chwen-Wei Su
(74) *Attorney, Agent, or Firm* — Matthew S. Bedsole (57) ABSTRACT

To make it possible for bores (16) that are in line with one another to be efficiently worked by means of a boring bar (2), the boring bar has a main body (10) with an axis of rotation (R) and a number of cutting elements (12, 12A) at intervals from one another in the axial direction (4) and also guiding elements (14) for guiding the main body (10) in a guiding bore (16A). The guiding elements (14) are kept at a distance from the axis of rotation (R) equivalent to a guide radius (r1). The main body (10) is divided into a functional region (19) and an eccentric region (10), wherein the cutting elements (12, 12A) and the guiding elements (14) are
(Continued)

arranged such that they are distributed around the main body (10) over an angular range (a) of less than 180°. Furthermore, the circumferential side (22) of the main body (10) can be passed eccentrically through a respective bore (16, 16A) of which the unworked tube radius (r2) is less than the guide radius (r1).

24 Claims, 5 Drawing Sheets

(52) U.S. Cl.
CPC ....... *B23B 2229/04* (2013.01); *B23B 2229/08* (2013.01); *B23B 2250/04* (2013.01); *B23B 2250/16* (2013.01); *Y10T 408/03* (2015.01); *Y10T 408/39* (2015.01); *Y10T 408/558* (2015.01); *Y10T 408/5583* (2015.01); *Y10T 408/5584* (2015.01); *Y10T 408/5586* (2015.01); *Y10T 408/76* (2015.01)

(58) Field of Classification Search
CPC ....... B23B 29/03; B23B 29/02; B23B 29/022; B23B 29/03432; B23B 29/03478; B23B 2229/04; B23B 2229/08; B23B 2270/04; B23B 2270/54; Y10T 408/03; Y10T 408/76; Y10T 408/39; Y10T 408/558; Y10T 408/5583; Y10T 408/5584; Y10T 408/5586
See application file for complete search history.

(56) References Cited

U.S. PATENT DOCUMENTS

| | | | | | |
|---|---|---|---|---|---|
| 3,191,463 | A | * | 6/1965 | Ladendorf | B23B 51/0486 408/200 |
| 3,386,317 | A | * | 6/1968 | Flick | B23B 29/02 279/141 |
| 3,530,744 | A | * | 9/1970 | Jacobson | B23Q 1/5468 408/186 |
| 4,224,846 | A | * | 9/1980 | Eysel | B23B 29/03457 408/147 |
| 4,596,498 | A | * | 6/1986 | Kress | B23D 77/02 408/200 |
| 6,536,997 | B1 | * | 3/2003 | Kress | B23B 29/02 408/1 R |
| 2004/0096283 | A1 | * | 5/2004 | Nomura | B23B 31/11 408/59 |
| 2006/0045640 | A1 | * | 3/2006 | Hessman | B23B 51/0493 408/81 |
| 2007/0237592 | A1 | * | 10/2007 | Nomura | B23B 51/0486 408/199 |

FOREIGN PATENT DOCUMENTS

| | | |
|---|---|---|
| DE | 19721997 A1 | 12/1998 |
| EP | 0970770 A1 | 1/2000 |

OTHER PUBLICATIONS

International Search Report for corresponding PCT application PCT/EP2014/001486, mailed Oct. 13, 2014, 2 pages.
German Office Action prepared on Jul. 21, 2015 in Application No. 10 2013 210 332.8, 5 pages.
Jan. 17, 2017 Second Office Action K-04342-DE-NP.

* cited by examiner

CUTTING TOOL, PARTICULARLY A BORING BAR, AS WELL AS A PROCESS FOR MACHINING A NUMBER OF BORES

CROSS REFERENCE TO PRIORITY APPLCIATIONS

This application is a U.S. National Phase of PCT/EP2014/001486, filed Jun. 3, 2014, which claims the benefit of German Application No. 10 2013 210 332.8, filed Jun. 4, 2013, each of which are incorporated by reference in their entireties.

BACKGROUND OF THE INVENTION

The invention relates to a rotating cutting tool, particularly a boring bar with the features of the preamble of claim 1 as well as a process for machining with the assistance of such a cutting tool a number of bores that are particularly spaced apart from one another by a predetermined spacing in the axial direction.

A boring bar of this type as well as a process of this type can be found in EP 0 771 602 B1.

Bearing shafts, for example camshafts or crankshafts in motor vehicles, are typically supported at multiple bearing bars spaced apart from one another axially in bearing bores, which are designated hereinafter simply as bores. Individual bores in this case are typically bored out to a final dimension with the assistance of a so-called line boring bar. To this end, the boring bar has cutting edges, each of which is provided for machining a respective bore, arranged offset with respect to one another by the respective spacing in the axial direction. Thus, several of the bores are machined simultaneously by the cutting edges spaced apart from one another in the axial direction.

Therefore, working positions are formed at the boring bar, with one cutting edge each according to the spacing of the bores. Typically, only one cutting edge is formed per working position to do this.

The boring bar must be guided or supported for the boring process. Direct support of the boring bar in the area of the respective cutting edges is not readily possible via guide elements such as guide rails, as known, for example, with reamers, because the boring bar must initially be inserted through the rough bores to be processed.

In order to make this possible, cutting edges and/or guide elements are arranged offset in the radial direction in accordance with EP 0 771 602 B1. The initially radially offset elements are extended in the radial direction after the retraction of the boring bar, which means that a respective bore can be bored out to the desired final dimension. This design requires a moving, mechanically complex arrangement of the cutting edges and/or guide elements. In addition, there must be reliable assurance that when the boring bar is withdrawn, the elements are radially retracted, at least a section, so that the surface of the machined bearing bores is not damaged when the boring bar is removed.

OBJECT OF THE INVENTION

Based on this, the object of the invention is to enable simple machining, particularly of such types of workpieces having bores spaced apart from one another by a predetermined spacing in the axial direction.

ATTAINMENT OF THE OBJECT

The object is attained according to the invention by a cutting tool having the features of claim 1, as well as by a process having the features of claim 18. Preferred further embodiments are set out in the respective dependent claims. The advantages presented and preferred embodiments with regard to the cutting tool should also be correspondingly applied to the process and vice versa.

The cutting tool is particularly a boring bar with a plurality of cutting elements spaced apart from one another in the axial direction. The inventive principle described in more detail below is transferred, however, to further rotating cutting tools as well having, for example, only one axial cutting position. In particular, the cutting tool is alternatively a so-called guide-rail tool, in which at least one guide element and one cutting element are positioned in an at least approximately equivalent cutting and guide radius. In particular, the cutting tool is formed as a cutting reamer. The invention is explained in more detail below in connection with a boring bar without limiting the generality.

The boring bar is generally used to machine bores spaced at a predetermined spacing with respect to one another in an axial direction. The bores in this case are typically spaced multiple centimeters apart from one another. The total length of the boring bar is typically several multiples of 10 cm, for example up to 50 cm or even more. The boring bar in this case has a basic body extending in the axial direction, which extends along a rotational axis around which it rotates during operation, in the actual boring process, with the assistance of a tool spindle. Multiple work position offset with respect to one another in the axial direction are formed on the basic body with one cutting element each. As a supplement to this, there is additionally a guide position on the basic body formed with at least one but preferably two guide elements. During the machining process, the boring bar is supported in a guide bore at the guide position via the guide elements.

Both the cutting element and the guide elements in this case are typically attached to the basic body as a separate body. The guide elements are typically formed as guide rails. The cutting body is typically a hard metal cutting insert which is bolted to the basic body, for example. In a similar manner, the guide rails are preferably soldered-on hard metal rails, for example. Alternatively to separate guide elements, the at least one guide element is formed by the basic body itself; in particular, the peripheral side of the basic body forms the guide element.

The guide elements in this case are in a guide radius with respect to the rotational axis. The basic body is then subdivided into a function area having the functional elements and an eccentric area, wherein the function area and thus the function elements extend only over an angle range of less than 180°. At the same time, a peripheral side of the basic body in the opposite eccentric area has a reduced distance with respect to the rotational axis as compared to the guide radius.

By means of this basic body somewhat contracted in the eccentric area in conjunction with the arrangement of the function elements on only one half of the basic body, there is thus the possibility of guiding the boring bar through the respective bores wholly eccentrically, i.e. radially offset with respect to the rotational axis, wherein the bore radius thereof is less than the guide radius. At the same time, however, direct support of the boring bar is ensured at the working position during the actual boring process, i.e. in the immediate area of the cutting edge.

This design is based on the observation that the boring bar is already reliably supported concentrically when the guide elements are reliably supported within a peripheral area in which the boring bar is pushed away due to the cutting forces that occur during the boring process. The term concentric support in this case is understood to mean that the rotational axis coincides with the bore axis. Because the function elements are arranged only on one side, expansion space can be obtained on the opposite "free" peripheral side, which means that suitable eccentric insertion of the boring bar into the bores is possible and the actual parallel machining process of several bearing bore can then occur with good support.

This basic principle, in which all function elements of the cutting tool, which quasi form an interfering contour, i.e. the cutting elements as well as the guide elements are at an angle range of less than 180°, combined with the special formation of the quasi flattened basic body in the eccentric area thus essentially makes possible eccentric retraction and also extension from a bore and simultaneously central machining of the bore. The eccentric extension prevents damage to the machined bore surface when the cutting tool is removed from the bore. In this respect, this underlying inventive principal is also of advantage with guide rail tools in which no axially offset cutting elements are arranged.

Advantageously, the peripheral side of the basic body extends in the eccentric area along a curved line, particularly along a circular arc. The center of this curved line in this case is arranged on a retraction axis, which is arranged eccentrically with respect to the rotational axis. In particular, it is displaced into the function area with respect to the rotational axis. Due to the particularly circular arc design, the eccentric area is thus formed—when viewed in cross-section or from above—by a semicircle, which is offset with its center in the function area to form the required clearance. Instead of a circular arc, another contour configuration is also possible, particularly, for example, an elliptical peripheral contour in the eccentric area.

In an appropriate embodiment, the peripheral side of the basic body also extends along a (circular) curved line in the function area. In this special embodiment, the extension of the peripheral side of the basic body can thus be approximated by two circular arcs, the centers of which are each offset in the direction of the other area.

According to a first embodiment, the guide elements are spaced apart from the cutting elements in the axial direction and in particular are arranged on a free end surface, without a cutting element arranged at the axial position of the guide elements. In this variant, the boring bar is initially retracted eccentrically through the bores until the guide position is established with the guide elements in a guide bore which preferably has been previously machined to a final dimension. Subsequently, the other bores are machined with the cutting elements. In this embodiment, the individual work positions and thus the individual cutting elements are preferably each offset equidistant with respect to one another by the same spacing in the axial direction, as predetermined by the spacing of the bores. This ensures parallel, simultaneous machining of the individual bearing bores.

In a preferred alternative embodiment, the guide elements are arranged at an equivalent axial position as one of the cutting elements, which means that the working position and the guide position coincide and a combined guide/working position is formed on the boring bar. The cutting element of the guide/working position, more precisely known as its cutting edge, is arranged in advance opposite the cutting edges of the other working positions in the axial direction with respect to the predetermined spacing. This enables a two-step machining process, in which, in a first processing step, the cutting edge of the guide/working position first machines a bearing bore into a guide bore. The guide and the support of the boring bar in this case occurs in the bore to be machined with the assistance of the guide elements, which are arranged for this purpose at the same axial position as the cutting element or slightly offset to the rear with respect to the cutting element, as is customary with machining processes using cutting reamers. Subsequently, in a second machining step, the other bores are simultaneously machined with the other cutting elements, while the boring bar is supported in the guide bore formed by the guide elements. This means that separate machining of the guide bores is no longer necessary and a work step is saved.

Expediently, in this case it is provided that the guide elements extend over an axial length which is measured such that it supports the basic body in the guide bore while the other bores are being machined. Thus, during the machining process, the guide bore is formed initially before the cutting edges of the other working position engage with the bores allocated to them. During the machining of these other bores, the basic body is supported in the guide bore by the guide elements extending longitudinally.

Expediently, the guide/working position is formed in a center area of the basic body. Particularly with very wide projection lengths of the boring bar, this enables center support and thus good concentric guiding during machining of the guide bore.

Due to the formation of the eccentric area, the basic body has no circular geometry viewed in cross-section, which leads to imbalance during a rotation around the rotational axis. In order to at least reduce this imbalance, the arrangement of a balancing element is provided according to a preferred further embodiment. Said balancing element in this case forms a component of the basic body, which can thus be subdivided into a base body and at least one balancing element. This means that the inherent imbalance will be at least partially compensated for and improved concentricity will be achieved.

To prevent interfering contours from forming in the peripheral direction, in an appropriate embodiment the balancing element is flush with the base body. The balancing element and the base body thus merge into one another, preferably free of bends and indentations when viewed in the peripheral direction. At the transition point, the balancing element and the base body thus preferably have the same radius. To this end, the maximum expansion of the balancing element in the radial direction preferably corresponds to the maximum radius of the eccentric area.

In a preferred embodiment, the balancing element is formed as a whole—when viewed in cross-section—as a circular segment. Corresponding to this, the base body is also formed as a circular segment. The balancing element in this case is particularly formed within the eccentric area. The balancing element and the base body are thus connected to one another at each other's flat sides. This enables the balancing element to be attached to the base body over a large area. The circular segment defined by the balancing element in this case is typically less than that of the base body. When viewed in cross-section, the base body has, for example, 60% to 80% of the total cross-sectional surface area of the basic body. The balancing element takes up the remaining portions of the surface area.

In order to achieve the desired balancing of the imbalance, the balancing element in the base body preferably consists of various materials which differ in density. In particular, for this purpose, the balancing element consists of a heavier material than the base body. This means that the cross-sectional surface areas lacking in the eccentric area are partially compensated for by the higher densities with respect to the mass distribution. The material used for the balancing element is preferably a heavy metal. On the other hand, the base body preferably consists of a lighter material, particularly a tool steel.

In a preferred further embodiment, however, a residual imbalance is intentionally set at least at certain axial positions, so that a resulting force develops in the direction of the guide area. Due to the incomplete compensation of the imbalance, at least locally, the tool is pressed against the workpiece to be machined, particularly against the bearing bar to be machined, as a result of the remaining imbalance. This means that an altogether stable contact is ensured, particularly of the guide elements at the workpiece to be machined. This thus effectively prevents undesirable lifting off of the surface to be machined. Such lifting-off could be exerted by external interfering variables such as, for example, vibrations from the machine or even by an uneven dimension.

In a preferred embodiment, the residual imbalance is produced only at defined axial positions, and otherwise the basic body is completely balanced—in a respective cross-sectional area. Preferably, the residual imbalance is set in a targeted manner only in the area of the guide elements. Due to the resulting centrifugal force caused by the residual imbalance, the radial forces caused by the imbalance can be easily absorbed at the bearing bars. Otherwise, the imbalance at other axial positions not supported via the bearing bars could lead to undesirable vibrations and thus negatively impact the machining result.

In a preferred further embodiment, due to the arrangement of the balancing element, an energy absorption element is further created for damping vibrational energy. Due to the provision of the separate balancing element, an additional option is thus created to provide a damping element to absorb vibrational energy and, as a result, lifting-off is prevented or at least reduced. To this end, the energy absorption element may be formed, for example, by a special design of the balancing element itself. For example, the specific selection of material has an vibration-dampening effect on the balancing element because it is made of a heavier material. Such an element is essentially advantageous for low-vibration concentricity.

In an appropriate embodiment, the balancing element is bonded to the base body, particularly for the purpose of forming the energy absorption element. On one hand, a reliable attachment is achieved by bonding. In addition, the particular advantage is obtained in that the adhesive, having a certain elasticity, converts the kinetic energy into internal frictional heat, for example during bending or torsional vibrations, whereby the vibrational energy is thus dampened.

Particularly with very long cutting tools, in a preferred further embodiment, the base body is subdivided into two parts, which can be reversibly detachably connected to one another on at least one point of separation via a suitable tool coupling. For example, the two parts can be attached to one another via a threaded connection. Each of the parts in this case preferably has at least one of the function elements, that is, a cutting element and/or a guide element. Due to the ability to subdivide the cutting tool in the axial direction, a shorter rear part is first inserted, for example, at a point to be machined and only then is a front part bolted thereto. This makes insertion in tight spaces possible, for example.

Alternatively, this ability to subdivide is also utilized in that a first partial area of the workpiece is first machined with only a reduced cutting tool and subsequently a second partial area of the workpiece is machined after attachment of the second part. This is particularly advantageous with a plurality of bearing bars spaced apart from one another.

Finally, the capacity to subdivide is further utilized in order to cover various application areas having different lengths using one basic tool. Thus, variation in length is thereby made possible in order to machine with an equivalent basic tool, for example, different workpiece types that differ, for example, with respect to the number of bearing bars.

Essentially, it is also possible in this case to configure a middle part of the cutting tool to be replaceable via two points of separation.

Exemplary embodiments of the invention are explained below in greater detail based on the figures.

DESCRIPTION OF THE FIGURES

Each figure shows in simplified, schematic diagrams:

FIG. 5A-C shows representations of a boring bar inserted into bores according to a second embodiment for clarifying a two-step machining process, wherein

Parts having the same effect are given the same reference numbers in the figures.

DESCRIPTION OF THE EXEMPLARY EMBODIMENT

Figure 1A:
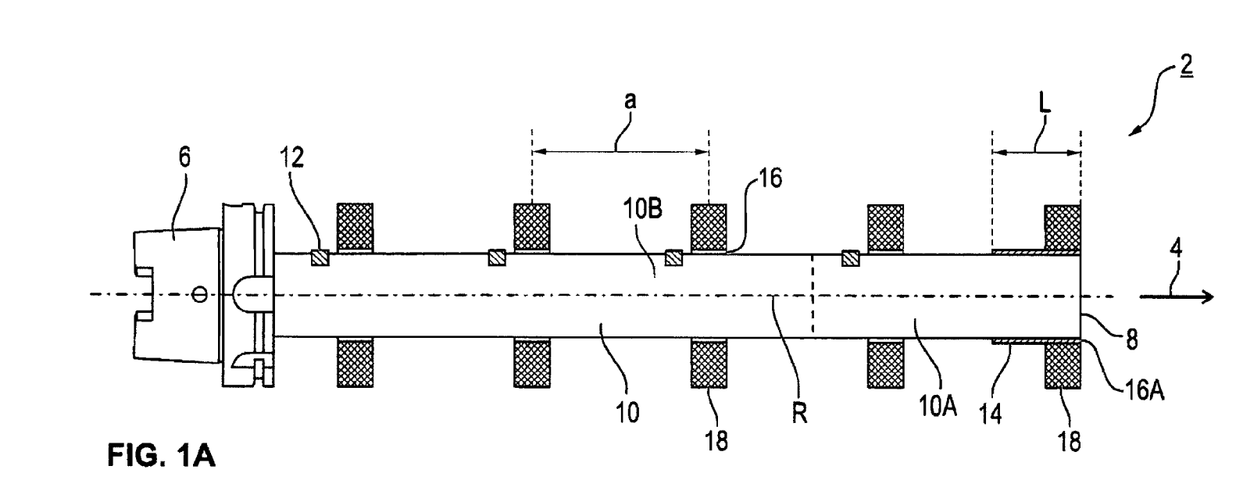
FIG. 1A,B shows a boring bar at the start and at the end of a machining process, which is inserted in multiple bores spaced apart from one another in a partial section of a side representation.
Figure 1B:
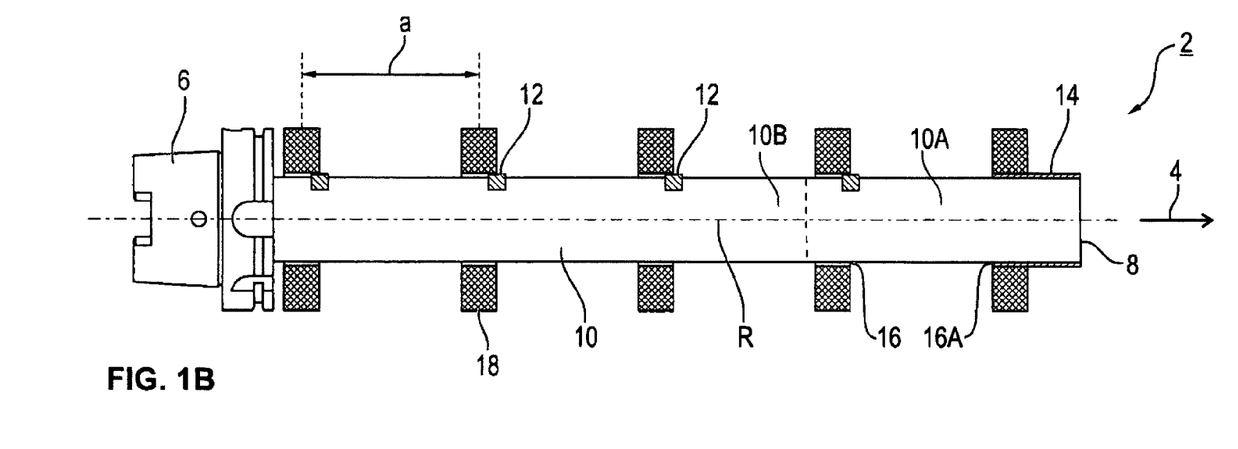
Figure 5A:
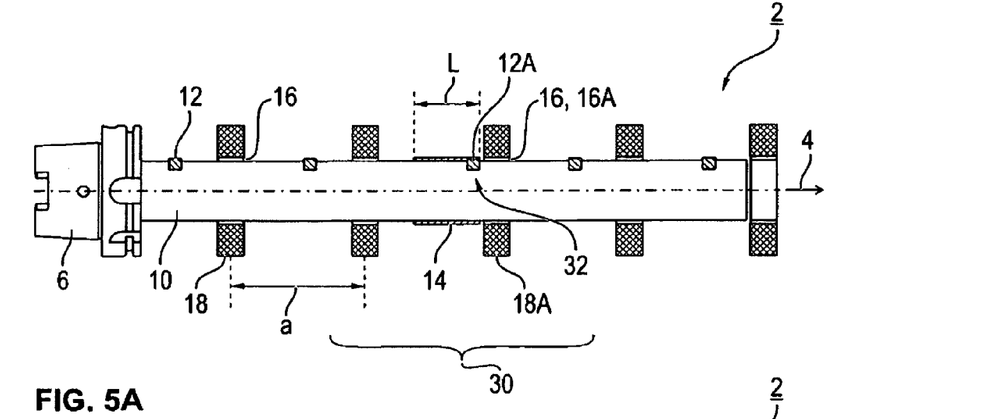
FIG. 5A shows a position of the boring bar before machining a bore for the guide bore.
Figure 5B:
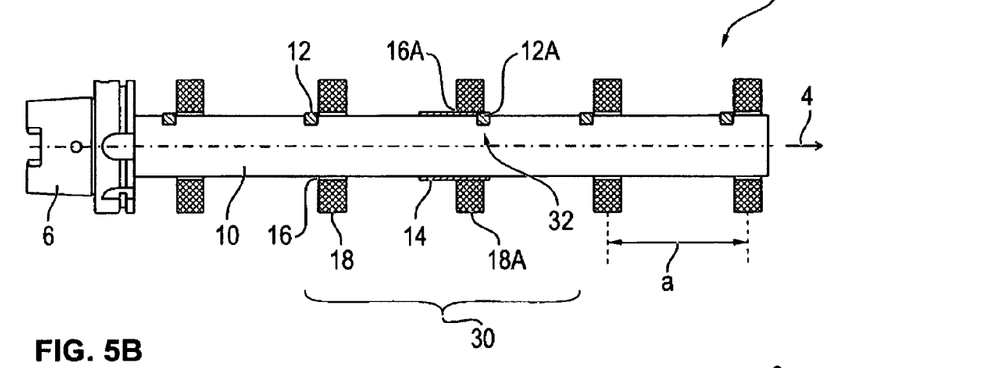
FIG. 5B shows an intermediate position before beginning the machining of the other bores.
Figure 5C:
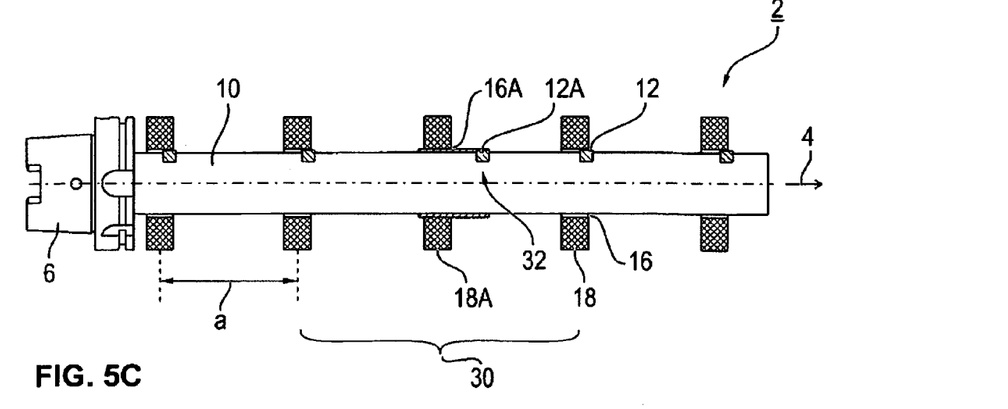
FIG. 5C shows an end position after machining the bores.

According to the two embodiments shown in FIG. 1A, 1B, and/or FIG. 5A, 5B, 5C, a boring bar 2, which is also designated as a line boring bar, extends in the axial direction 4 from a backside coupling 6 to a front end surface 8. Following the coupling 6, the boring bar 2 has a rod-shaped basic body 10, to which cutting elements 12 axially spaced apart from one another are attached to the basic body 10 in a respective working position. All of the cutting elements 12 in this case are arranged on the basic body 10 in the same angle position; they thus lie on a line. Only one cutting element 12 per working position is arranged on the basic body 10. Furthermore, guide elements 14 formed as a type of guide rails on the basic body are arranged at a guide position of the basic body 10. The cutting elements 12 and the guide elements 14 form function elements.

As an alternative to the variant shown with the positioning of the cutting elements 12 each at identical angle positions, the function elements, particularly the cutting elements 12, are arranged at the various axial positions at different angle positions. This serves particularly to reduce the tendency to vibrate. The cutting elements in this case are arranged offset, preferably only by a few degrees (e.g. less than 10°), with respect to a defined target angle position.

FIGS. 1A, 1B further show an optional embodiment in which the base body 10 is divided into two parts 10A, 10B via a reversibly detachable point of separation. The point of separation or coupling is represented only by a dashed line in the figures. The two parts, 10A, 10B, in this case connect with one another in the axial direction 4. The point of coupling can essentially be arranged in the axial direction 4, even following after the guide elements 16, which means that it is thus allocated to the rear part 10B. For example, it or another point of separation is formed at the front end surface shown in FIG. 1A, 1B, so that a (further) part can be attached to said end surface.

The boring bar 2 is generally used for simultaneously machining multiple bores 16, particularly a bearing bore, for example, for a crankshaft or camshaft. The individual bores 16 in this case are formed in the bearing bars 18 of a bearing housing, which are spaced apart from one another by a defined spacing a. Typically, adjacent bearing bars 18 are each spaced apart from one another by the same spacing a. Essentially, the individual bearing bars 18 and thus also the respective working positions may be spaced apart from one another at different spacings a. Spacing a is typically in a range of several cm, for example in a range of from 5 cm to 20 cm, depending on the size of the motor and cylinders. Five bearing bars 18 are shown in the exemplary embodiment. Depending on the motor setup, this can be fewer or more. All bores 16 are flush with one another, and thus have a common bore axis B, which typically coincides with a rotational axis R of the boring bar 2 in the machining state. The boring bar 2 rotates around a rotational axis R during the machining process.

For machining the bores 16, the general procedure is that the boring bar 2 is initially inserted through the bores 16 in the axial direction 4 until the individual cutting elements 12 are each positioned in front of the bores 16 allocated to them. To make it possible to retract the boring bar 2, it is eccentrically retracted into the bores 2, as is explained in more detail below. In this case, rotational axis R is arranged to be offset with respect to the boring axis B. The actual machining process then starts. For this purpose, the boring bar 2 is again concentrically aligned with respect to the boring axis B, so that the boring axis B and the rotational axis R again lie at least approximately above one another. Due to the rotation of the boring bar 2 around the rotational axis R, the actual machining process takes place in which the individual cutting elements 12 engage with the respective bore 16. With this type of machining, the boring bar 2 is supported by the guide elements 14 in one of the bores 16, hereinafter characterized as a guide bore 16A.

To make this basic work process possible, that is, the eccentric retraction with subsequent central alignment and starting of the boring process, the cutting elements 12 as well as the guide elements 14 are arranged at defined angle positions on the basic body 10. The special arrangement as well as the functional principle is explained in more detail below in FIGS. 2 to 4.

Figure 2:
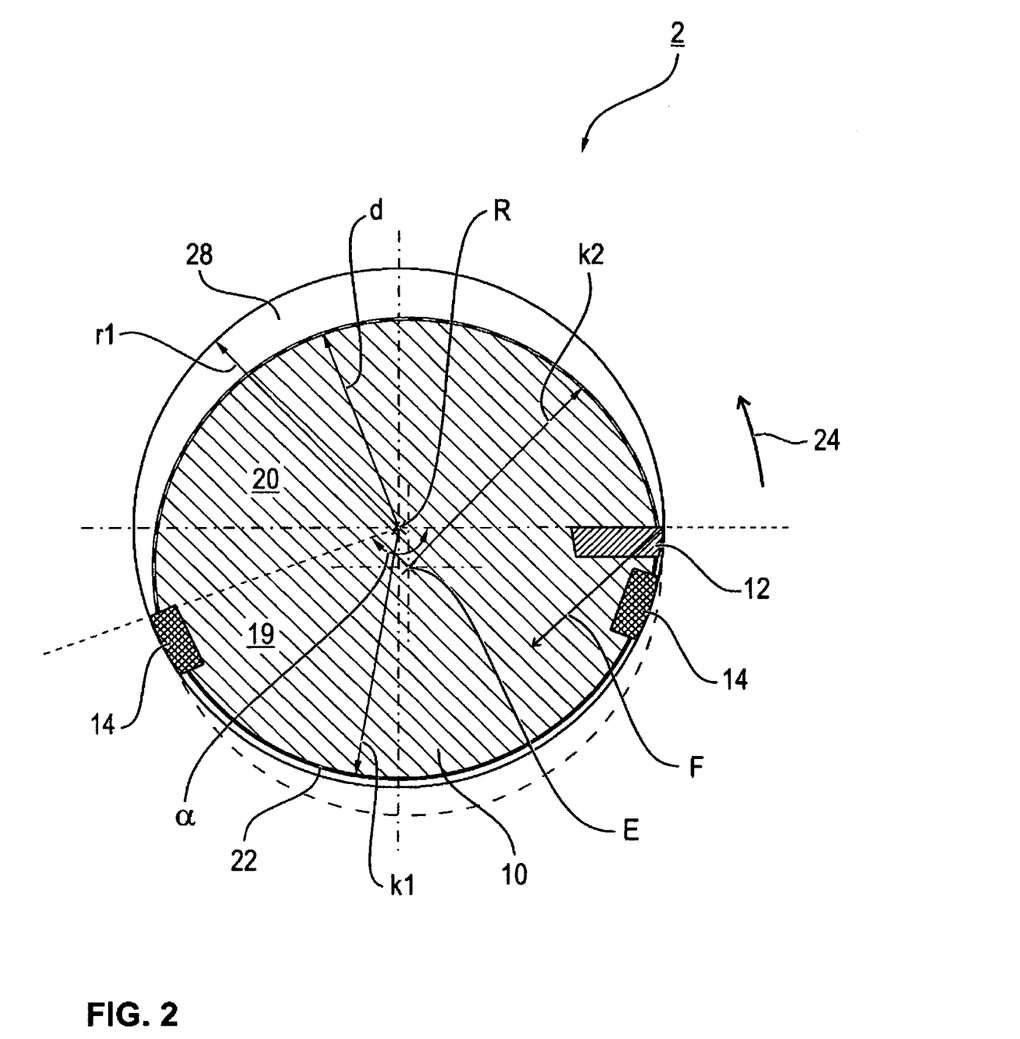
FIG. 2 shows a front view of a boring bar.

FIG. 2 shows a front view of the boring bar 2 with precisely two guide elements 14 as well as the foremost cutting element 12, to which the other cutting elements 12 connect in the axial direction 4 at the identical angle position.

The basic body 10 is subdivided into approximately two halves, wherein the one bar half forms function area 19 and the other bar half forms eccentric area 20. Within the function area 19, all function elements, namely the guide elements 14 and the cutting element 12, which form an interfering contour during retraction, are arranged at a peripheral side 22 of the basic body 10 distributed over an angle range α. The angle range α in this case is less than 180°. In the exemplary embodiment shown, these three function elements extend over an angle range α of about 160°. While the one guide element 14 is arranged in the rotational direction 24 directly following the cutting element 12, with an angular distance of 10° to 20°, for example, the second guide element 14 is arranged approximately at the end of angle range α with an angular distance to the cutting element 12 that ranges from 130 to 160°, for example.

The two guide elements 14 in this case are arranged such that a resulting force component F, which acts upon the basic body 10 during the cutting process, is oriented in the area between the two guide elements 14. This ensures that the guide elements 14 are pressed against a bore wall 26 during the machining process, which ensures a concentric guide of the boring bar 2.

The guide elements 14 are spaced apart from the rotational axis R by a guide radius r1. The cutting edge, which preferably is located identically on the same guide radius r1, defines the radially outermost point of the cutting element 12. With some embodiments, the cutting edge can also be somewhat radially offset to the inside in order to exert radial pretension on the guide elements 14.

The basic body 10 itself has a contour that deviates from the circular shape. In the exemplary embodiment, the basic body 10, when viewed in cross-section, is composed, at least approximately, of two circular segments positioned against one another. Thus, in the function area 19, the peripheral side 22 extends along a circular arc with a first circular radius k1 around the rotational axis R. In the eccentric area 20, the peripheral side 22, on the other hand, extends along a second circular curve with a second circular radius r2 around an axis designated as retraction axis E, and which is offset with respect to the rotational axis R. As can be seen particularly in FIG. 2, retraction axis E is arranged offset in the radial direction with respect to the rotational axis R, wherein it is shifted into the function area 19. This means that a distance d from the rotational axis R to the peripheral side 22 (particularly measured at a position in the center of the angle range (360°−α) of the eccentric area 20) is significantly reduced in comparison to the guide radius r1, which means that clearance or expansion space 28 is formed in a general sickle shape adjacent to the eccentric area 20. The guide radius is, for example, 10-30% greater than the distance d. FIG. 2 shows by dashed line a circle with the second circular radius k2 around the retraction axis E. At the same time, a guide circle with the guide radius r1 is shown as a solid circular line around the rotational axis R.

Due to the expansion space 28 formed, the basic body 10 can be offset radially in the direction of said expansion 28 for insertion of the boring bar 2 into the bores 16, so that the boring bar 2 can be processed with the cutting elements 12 and the guide elements 14. This insertion process is explained using FIG. 3:

To insert the boring bar 2 through the bore 16, the boring bar 2 is routed through the bores 16 eccentrically with respect to the bore axis B along the retraction axis E. The contour and dimensioning of the eccentric area 20, particularly that of the peripheral side 22 in the eccentric area 20 is selected such that, with this type of eccentric infeed, it is ensured that the individual function elements 12, 14 have clearance with respect to the bore wall 26 of the un-machined bore 16. In the un-machined state, the bore 16 has an unworked radius r2, which is shown by a reference line in FIGS. 3 and 4.

Figure 4:
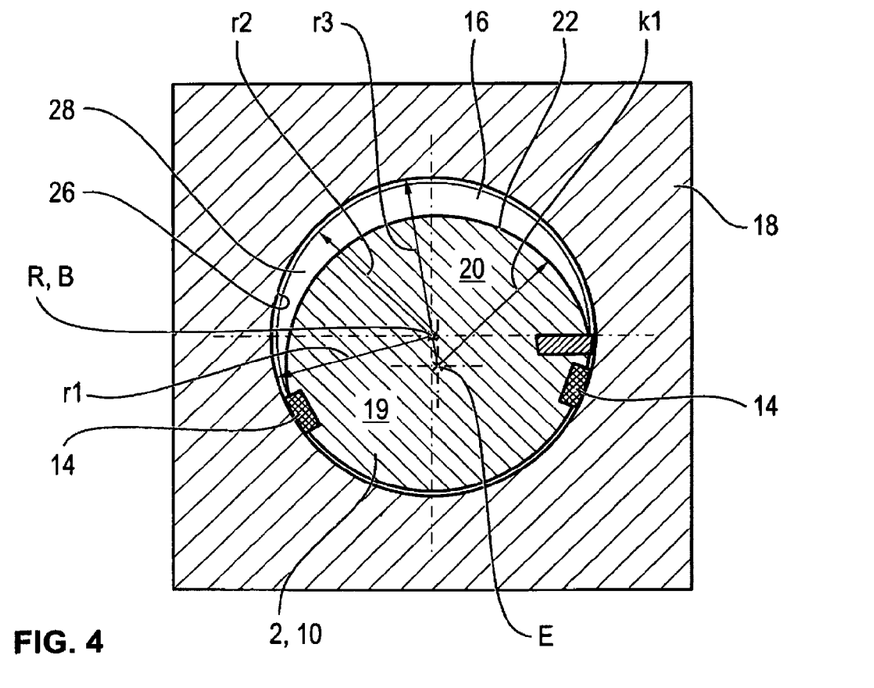
FIG. 4 shows a representation similar to FIG. 3, wherein, in this case however, the boring bar is displaced into a central machining position in which the actual boring process takes place.

In order to machine, the boring bar 2 is again centered, i.e. radially offset, so that the bore axis B and the rotational axis R are in alignment with one another, as shown in FIG. 4. The machining process then takes place in this state. To this end, the boring bar 2 is set into rotation around the rotational axis R in the direction of rotation 24, so that the respective cutting element 12 machines the inner wall of the bore 26 and bores it out to an end radius r3.

The boring bar 2 is concentrically guided by the guide elements 12. To ensure the most exact concentric guiding of the boring bar 2 possible, the guide elements 14 are preferably arranged somewhat eccentrically with respect to the rotational axis R or are arranged on a somewhat larger radius, as is described in the applicant's German patent application DE 10 2012 223 183.8, which had not yet been published at the time of application. In this regard, please refer to the content of the disclosure contained in this application in its entirety, which is incorporated herewith.

Alternatively or in addition to this, a so-called alignment adapter is used. It is placed intermediately between a tool holder (spindle) of a machine tool and the cutting tool. The alignment adapter holds the coupling 6 of the cutting tool. Within the alignment adapter, depending on the embodiment of the alignment adapter it may be optionally or in combination offset or tilted. Taken as a whole, this makes it possible to concentrically guide and adjust the boring bar 2.

Figure 3:
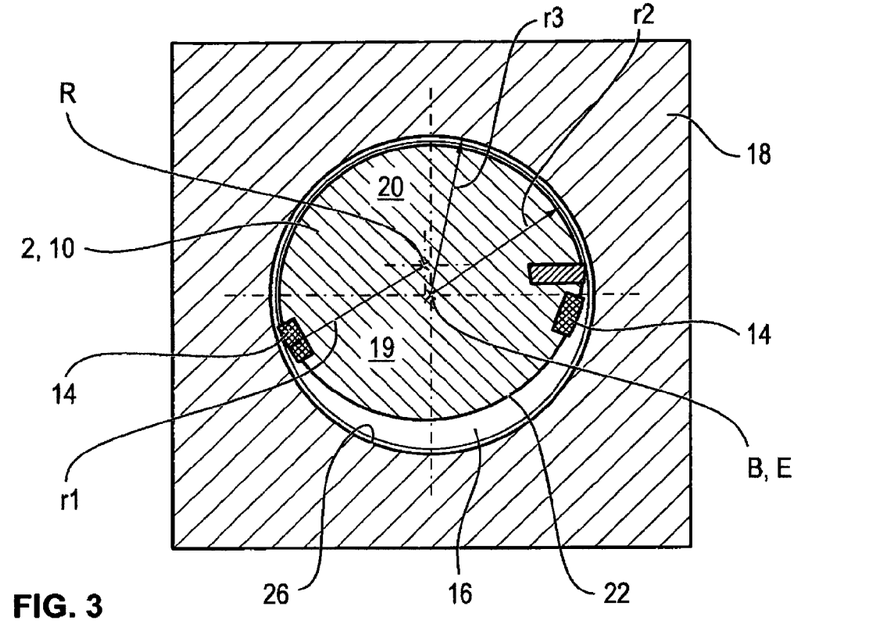
FIG. 3 shows a front view of a bore to be machined with a boring bar set therein, with eccentric retraction of the boring bar into the bores.

The basic principle described in FIGS. 2 to 4 is realized in both the first embodiment according to FIGS. 1A, 1B and in the second embodiment according to FIGS. 5A-5C.

In the first embodiment, the guide elements 14 are formed on the front face of the basic body 10 without a cutting element 12 being arranged at this position of the basic body 10, designated as the guide position. With this embodiment, the guide bore 16A, in a separate preparatory process step, is initially bored out to the end radius r3, before the boring bar 2 is then inserted. It is initially inserted into the guide bore 16 eccentrically with its guide elements 14. Then, after the centering of the boring bar 2, the machining process of the other bores 16 starts. The individual cutting elements 12 are thus likewise spaced apart from one another by a spacing a, in particular are equidistant to one another corresponding to spacing a.

In contrast to this, with the embodiment according to FIGS. 5A-5C, common machining of all bores 16 is possible with only a single retraction of the boring bar 2. Thus, no preliminary machining of a bore is necessary to form a guide bore 16A. The machining process is a two-step process in this case, wherein, in a first step, the guide bore 16A is first formed and then, in a second machining step, the other bores 16 are then machined. Essentially, more than one guide bore 16A could be formed.

The guide bore 16A in this case is formed according to what is known as the guide-rail principal, as it is known, for example, with reamers.

To do this, one of the working positions, each of which has a cutting element 12 allocated to it, is simultaneously formed as the guide position, which means that a combined guide/working position 32 is formed on the basic body 10. This is characterized in that, in addition to the cutting element 12, the guide elements 14 are simultaneously also arranged at this position. The guide elements 14 thus start in approximately the axial position of the cutting element 12 and extend to the rear in the axial direction 4 over an axial length l. The guide/working position 32 in this case is appropriately formed in a center area 30 of the boring bar 2.

With the embodiment described here having a total of five bearing bars 18, this guide/working position 32 is thus allocated to the third and thus the center bearing bar 18A. In contrast to the first exemplary embodiment according to FIGS. 1A, 1B, the individual cutting elements 12 are no longer distributed equidistant in the axial direction 4. Instead, the center cutting element 12A of the guide/working position 32 or the spacing a is arranged in advance in order to ensure that the center bearing bar 18A is first machined and a guide bore 16A is formed. Thus, the center cutting element 12A is offset to the front by approximately the width of the bearing bar 18A starting from an equidistant arrangement in the direction of the next cutting element 12 and simultaneously spaced this distance away from the cutting element 12 connecting from the backside. As can be seen in FIG. 5B, the deviation in this case from the uniform distribution is somewhat less than the width of the bearing bar 18, which means that the other cutting elements 12 already make contact when the center cutting element 12A is still located in the guide bore 16A. At this time, the boring bar 2 is being supported via the guide elements 14 in the guide bore 16A.

With this embodiment, the guide elements 14 are also crucial for reliable concentric guiding of the boring bar 2 while the guide bore 16A is being machined. This requires that they start at substantially the same axial height as the center cutting element 16A.

The axial length L of the guide elements 14 should be measured—just as in the first exemplary embodiment—such that the basic body 10 is supported while the other cutting elements 12 are machining the bores 16. The axial length L is thus greater than the axial extension of the bearing bar 18 and is typically also greater than the axial extension of the cutting elements 12; in particular, it is a multiple of the axial extension of the bearing bar 18 and/or of the cutting elements 12.

Figure 6:
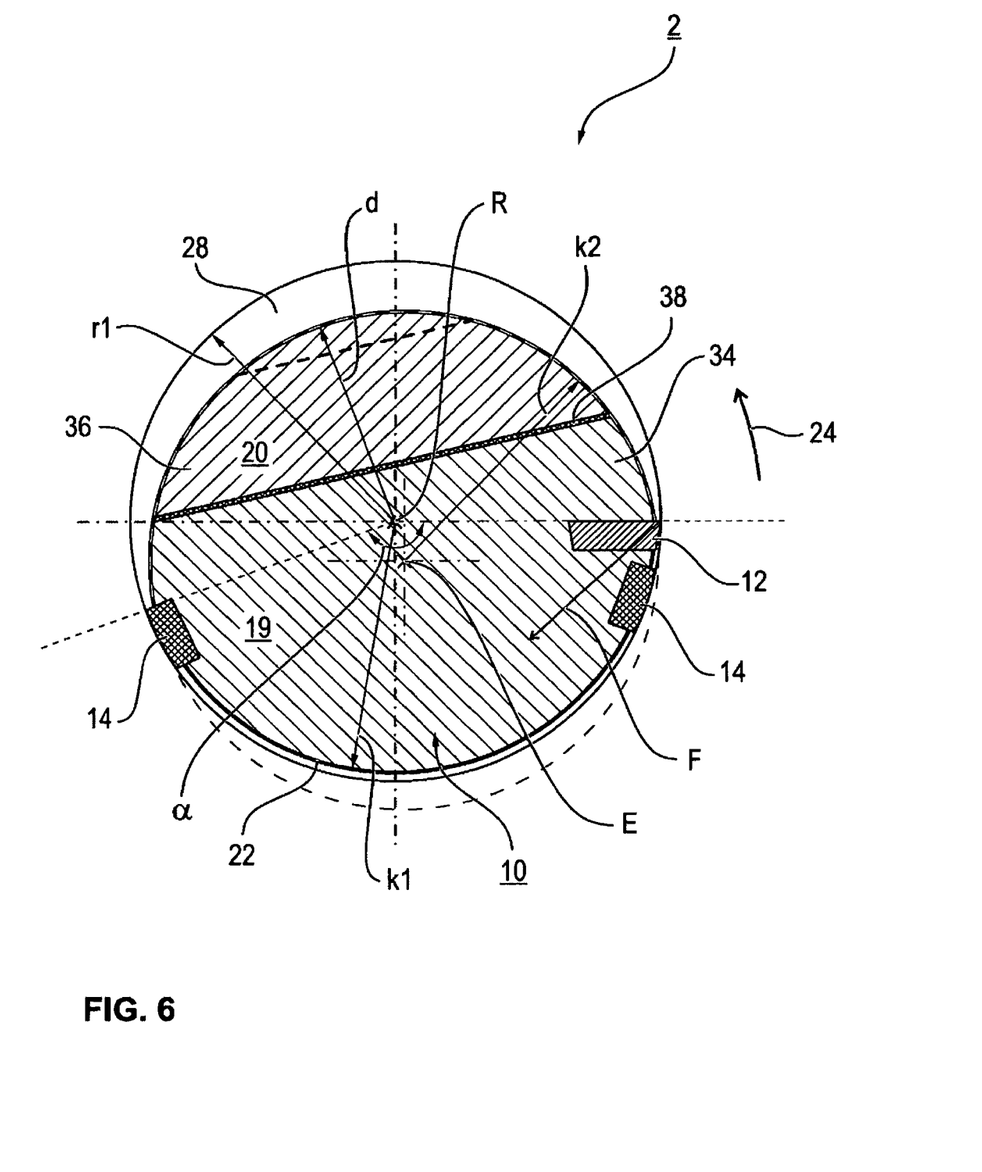
FIG. 6 shows a representation comparable to FIG. 2 of a further embodiment with a balancing element.

In connection with FIG. 6, further embodiments are explained in which the basic body 10 is subdivided into a base body 34 and a balancing element 36 attached thereto. The balancing element 36 is connected to the base body 34 by means of an adhesive layer 38. As a supplement, a threaded connection may also be provided in addition.

As can be seen in FIG. 6, the balancing element 36 is formed as a circular segment, when viewed in cross-section. The circular segment covers an angle range of between 110° and 180°, for example. In the exemplary embodiment, it covers an angle range of about 150°. The balancing element 36 in this case extends in the axial direction and thus has a partially cylindrical jacket surface around the periphery. The side that attaches to the base body 34 is formed as a flat side. Corresponding to the balancing element 36, the base body 34, when viewed in cross-section, is formed as a type of circular segment. Thus, the base body 34 takes up a larger cross-sectional surface area, when viewed in cross-section, than does the balancing element. The balancing element 36 preferably consists of a heavy metal, while the base body 34 consists of a lighter steel, particularly a tool steel.

Because of the balancing element 36, an imbalance caused by the expansion space 28 (with a homogeneous design of the basic body 10) is at least partially compensated.

It is preferable in this case if a residual imbalance is retained at least in some areas at defined axial positions. Essentially, an imbalance during operation results in a force component in the radial direction when the basic body 10 is rotating around the rotational axis R. Due to the resulting centrifugal forces, said force is oriented in the direction of the larger mass-surface density, i.e. essentially in the direction of function area 19. In an advantageous embodiment, this is then utilized to the extent that the residual imbalance is set only at defined axial positions at which the guide elements 14 are attached. This means that, during operation, a radial force is exerted in the area of these guide elements 14, so that they are reliably pressed against the workpiece surface to be machined. In contrast to this, there is complete balance in axial areas of the basic body 10 distant from this, which means that, in areas outside of the guide elements 14, there is homogeneous mass distribution with respect to the rotational axis R, so that no force results during operation.

Generally different residual imbalances may be set at various axial positions spaced apart from one another.

The residual imbalance is preferably adjusted by removing material from the balancing element 36 at the desired axial positions of the residual imbalance. This is depicted in FIG. 6 by a dashed line. Thus, in the area of the residual imbalance, the otherwise partially cylindrical balancing element 36 is also flattened in a sub-area toward the peripheral side.

Another particular advantage of the arrangement of the balancing element 36 can be seen in its vibration-damping property. On one hand, the use of the heavy metal has a positive effect of preventing vibrations. In addition, this vibration-damping property is supported by the adhesive connection via the adhesive layer 38. Kinetic energy and thus vibrational energy can be absorbed via the adhesive layer 38 due to the inner friction effects. This means that kinetic energy is absorbed and any vibrations, such as flexural or torsional vibrations, are effectively dampened.

In an appropriate embodiment, different residual imbalances are set at the different axial positions. This measure provides the option of adjusting the force exerted in the direction of the function elements during operation for each bearing point, i.e. for each bearing bar. Thus, a larger residual imbalance is set, for example, for the front function elements, which are further away from the backside coupling 6.

The invention claimed is:

1. A cutting tool, particularly a boring bar for machining bores spaced apart from one another by a predetermined spacing (a) in the axial direction, comprising a basic body extending in the axial direction having a rotational axis (R) and having at least one cutting element, as well as a number of guide elements for guiding the basic body in a guide bore, wherein the guide elements are spaced apart by a guide radius (r1) with respect to the rotational axis (R), wherein the basic body is subdivided into a function area and an eccentric area, when viewed in cross-section, and the cutting elements as well as the guide elements are distributed around the basic body arranged over an angle range ($\alpha$) of less than 180°, and in that the peripheral side of the basic body has a reduced distance (d) with respect to the rotational axis (R) in comparison to the guide radius (r1) in the eccentric area; and wherein the peripheral side of the basic body extends along a curved line in the eccentric area, the center point of which is arranged on a retraction axis (E), which is displaced into the function area opposite the rotational axis (R).

2. The cutting tool according to Claim 1, wherein the peripheral side in the function area extends around the rotational axis (R) along a circular arc having a first circular radius (k1), and in the eccentric area (20) extends around the retraction axis (E) along a circular arc having a second circular radius (k2).

3. The cutting tool according to claim 1, wherein the guide elements are spaced apart from the at least one cutting element in the axial direction.

4. The cutting tool according to claim 1, wherein the guide elements are arranged at an axial position equivalent to the at least one cutting element at a guide/working position.

5. The cutting tool according to claim 4, wherein the cutting element of the guide/working position is arranged in a leading position in the axial direction compared to other cutting edges with respect to the predetermined spacing, so that, to form the guide bore, when machining the bores, the bore at the guide/working position is machined first.

6. The cutting tool according to claim 5, wherein the guide elements extend over an axial length (l) which is measured such that it supports the basic body in the guide bore while the other bores are being machined.

7. The cutting tool according to claim 4, wherein the guide/working position is formed in a middle area of the basic body.

8. The cutting tool according to claim 1, wherein the basic body has a base body as well as at least one balancing element, which is designed to at least partially balance an imbalance that would otherwise exist.

9. The cutting tool according to claim 8, wherein the balancing element is flush with the base body around the periphery.

10. The cutting tool according to claim 8, wherein the balancing element is formed as a circular segment when viewed in cross-section, particularly within the eccentric area.

11. The cutting tool according to claim 8, wherein the balancing element is formed from a denser material than the base body.

12. The cutting tool according to claim 8, wherein a residual imbalance is intentionally set such that during operation a resulting force is generated in the direction of the guide area.

13. The cutting tool according to claim 12, wherein the residual imbalance is developed only at an axial position at which a guide element is arranged.

14. The cutting tool according to claim 8, wherein the arrangement of the at least one balancing element simultaneously creates an energy absorption element designed to dampen vibrational energy.

15. The cutting tool according to claim 8, wherein the balancing element is bonded to the base body.

16. The cutting tool according to claim 1, wherein in the axial direction, the base body is subdivided into at least two parts, which can be reversibly connected to one another, and each of the parts has at least one cutting element or guide element.

17. A process comprising:
    machining a number of bores spaced apart by a predetermined spacing (a) with the assistance of a cutting tool according to claim 1.

18. The process according to claim 17, wherein the process comprises, prior to machining the number of bores:
    first, operating the cutting tool eccentrically in the axial direction through the bores;
    then, radially offsetting the cutting tool in the direction of the rotational axis (R), and in that the machining of the bores starts afterwards,
    wherein the basic body is supported in a guide bore with the guide elements.

19. The process according to claim 17, wherein a two-step machining process occurs, wherein, in a first machining step, one of the bores for forming a guide bore is machined with the assistance of the boring bar, then the boring bar is further advanced in the axial direction and further bores are then machined, and simultaneously the basic body is supported in the guide bore via the guide elements.

20. The process according to claim 17, wherein the bores are bored out from an unworked radius (r2) to an end radius (r3), wherein the unworked radius (r2) is less than the guide radius (r1).

21. The process according to claim 17, wherein each of the bores has an unworked radius (r2), and wherein the unworked radii (r2) of all bores are equal.

22. The process according to claim 17, wherein all bores of the workpiece are machined in a single retraction of the cutting tool.

23. A cutting tool, particularly a boring bar for machining bores spaced apart from one another by a predetermined spacing (a) in the axial direction, comprising a basic body extending in the axial direction having a rotational axis (R) and having at least one cutting element, as well as a number of guide elements for guiding the basic body in a guide bore, wherein the guide elements are spaced apart by a guide radius (r1) with respect to the rotational axis (R), wherein the basic body is subdivided into a function area and an eccentric area, when viewed in cross-section, and the cutting elements as well as the guide elements are distributed around the basic body arranged over an angle range ($\alpha$) of less than 180°, and in that the peripheral side of the basic body has a reduced distance (d) with respect to the rotational axis (R) in comparison to the guide radius (r1) in the eccentric area;

wherein the basic body has a base body as well as at least one balancing element, which is designed to at least partially balance an imbalance that would otherwise exist; and wherein a residual imbalance is intentionally set such that during operation a resulting force is generated in the direction of the guide area.

24. A process comprising:

machining a number of bores spaced apart by a predetermined spacing (a) with the assistance of a cutting tool, the cutting tool comprising a basic body extending in the axial direction having a rotational axis (R) and having at least one cutting element, as well as a number of guide elements for guiding the basic body in a guide bore, wherein the guide elements are spaced apart by a guide radius (r1) with respect to the rotational axis (R), wherein the basic body is subdivided into a function area and an eccentric area, when viewed in cross-section, and the cutting elements as well as the guide elements are distributed around the basic body arranged over an angle range ($\alpha$) of less than 180°, and in that the peripheral side of the basic body has a reduced distance (d) with respect to the rotational axis (R) in comparison to the guide radius (r1) in the eccentric area; and wherein all bores of the workpiece are machined in a single retraction of the cutting tool.

* * * * *